US011146679B1

(12) United States Patent
Meyer et al.

(10) Patent No.: US 11,146,679 B1
(45) Date of Patent: Oct. 12, 2021

(54) METHOD AND APPARATUS FOR INTERACTIVE VOICE RESPONSE

(71) Applicant: UIPCO, LLC, San Antonio, TX (US)

(72) Inventors: Gregory Brian Meyer, San Antonio, TX (US); Mark Anthony Lopez, Helotes, TX (US); Ravi Durairaj, San Antonio, TX (US); Nolan Serrao, Plano, TX (US); Victor Kwak, Frisco, TX (US); Ryan Thomas Russell, San Antonio, TX (US); Christopher Russell, The Colony, TX (US); Ruthie D. Lyle, Durham, NC (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 16/887,392

(22) Filed: May 29, 2020

Related U.S. Application Data

(60) Provisional application No. 62/855,104, filed on May 31, 2019.

(51) Int. Cl.
H04M 3/493 (2006.01)
(52) U.S. Cl.
CPC .................... H04M 3/4936 (2013.01)
(58) Field of Classification Search
CPC ..... H04L 51/02; H04L 63/0428; H04L 63/08; H04L 67/02; H04L 67/34; H04L 63/083; H04L 63/10; H04L 61/605; H04L 63/0492; H04L 63/0884; H04L 67/025; H04L 67/04; H04L 69/22; H04L 51/32; H04L 63/0853; H04L 63/0876; H04L 63/102; H04L 67/10; H04L 67/125; H04L 2209/80; H04L 41/22; H04L 51/00; H04L 51/046; H04L 51/20; H04L 51/22; H04L 63/0807; H04L 67/1078; H04L 67/1091; H04L 67/12; H04L 67/141; H04L 67/18; H04L 67/38; H04L 67/42; H04L 9/0894; H04L 9/3213; H04L 9/3271; H04L 2209/84; H04L 2463/082; H04L 41/12; H04L 41/145;
(Continued)

(56) References Cited

U.S. PATENT DOCUMENTS

2013/0297802 A1* 11/2013 Laribi ..................... H04L 47/80
709/226
2017/0094052 A1* 3/2017 Zhang ................. H04M 3/2227
(Continued)

Primary Examiner — Akelaw Teshale
(74) Attorney, Agent, or Firm — Plumsea Law Group, LLC

(57) ABSTRACT

A system and method for providing an interactive voice response dialogue by using a cloud computing system coupled to a mobile computing device. The cloud computing system may receive a request from a mobile computing device to initiate communication with an interactive voice response system having a tree structure including audio files in the cloud computing system. An interactive voice response dialogue may be conducted using the cloud computing system when the mobile computing device does not have the capacity to receive the one or more files. When the mobile computing device does have the capacity to receive the one or more files, one or more files may be transmitted from the cloud computing system to the mobile computing device, so that he mobile computing device may conduct the interactive voice response dialogue.

20 Claims, 11 Drawing Sheets

(58) Field of Classification Search
CPC ... H04L 41/5061; H04L 43/106; H04L 43/50; H04L 51/10; H04L 51/12; H04L 51/16; H04L 51/24; H04L 51/38; H04L 63/0435; H04L 63/0442; H04L 63/06; H04L 63/061; H04L 63/068; H04L 63/0838; H04L 63/0846; H04L 63/105; H04L 63/108; H04L 63/1416; H04L 63/1433; H04L 63/1491; H04L 63/205; H04L 65/1016; H04L 65/1069; H04L 65/1073; H04L 65/60; H04L 67/146; H04L 67/22; H04L 67/26; H04L 69/24; H04L 9/0819; H04L 9/0825; H04L 9/0838; H04L 9/32; H04L 9/3228; H04L 9/3234; H04L 9/3242; H04L 9/3247; H04L 9/3263; H04M 3/42382; H04M 1/72403; H04M 3/42195; H04M 1/72406; H04M 1/72415; H04M 1/72436; H04M 1/72457; H04M 2207/18; H04M 7/0012; H04M 7/0057; H04M 1/72412; H04M 3/4936; H04M 3/436; H04M 1/663; H04M 2203/651; H04M 2250/60; H04M 3/42093; H04M 3/42153; H04M 3/42289; H04M 3/42297; H04M 3/42374; H04M 11/00; H04M 11/10; H04M 1/72418; H04M 1/72445; H04M 1/72448; H04M 1/72484; H04M 2203/2038; H04M 2242/04; H04M 2250/06; H04M 2250/12; H04M 3/42136; H04M 3/42263; H04M 3/42357; H04M 3/42365; H04M 3/48; H04M 3/5116; H04M 3/527

See application file for complete search history.

(56) References Cited

U.S. PATENT DOCUMENTS

| | | | |
|---|---|---|---|
| 2018/0063282 A1* | 3/2018 | Crowe | H04M 11/00 |
| 2018/0063325 A1* | 3/2018 | Wilcox | G09B 21/001 |
| 2018/0220000 A1* | 8/2018 | Segalis | G06Q 10/06 |
| 2018/0234545 A1* | 8/2018 | Barak | G06Q 30/0201 |
| 2018/0261203 A1* | 9/2018 | Zoller | G06Q 30/016 |

* cited by examiner

METHOD AND APPARATUS FOR INTERACTIVE VOICE RESPONSE

CROSS-REFERENCE TO RELATED APPLICATIONS

This application claims the benefit of Provisional Patent Application No. 62/855,104 filed Mar. 31, 2019, and titled "Method and Apparatus for Interactive Voice Response," which is incorporated by reference herein in its entirety.

TECHNICAL FIELD

The present disclosure generally relates to methods and systems for providing an interactive voice response dialogue, and in particular for providing an interactive voice response dialogue between a user and an interactive voice response system by using a cloud computing system coupled to a mobile computing device.

BACKGROUND

Interactive voice response (IVR) systems allow users such as customers or potential customers to interact with a host system of an organization using speech recognition or Dual Tone-Multi Frequency (DTMF) implemented by a keypad in order to make inquiries such as making inquiries regarding a product or service offered by the organization. IVR systems may be hosted by the organization or hosted for the organization by an information technology company. IVR systems can conduct a dialogue with a user through pre-recorded audio files or dynamically generated audio files. Although these IVR systems are configured to handle a large call volume, call volumes have continued to increase and there is a need to reduce the latency in the dialogue between the user and the IVR system due to the lengthy transmission paths (routes) for dialogue. The dialogue may also be referred to as an exchange of messages between a user and an interactive voice response system. The interactive voice response system may be stored in a cloud computing system.

There is a need in the art for a system and method that addresses the shortcomings discussed above.

SUMMARY

In one aspect, there is provided a method for providing an interactive voice response dialogue including activating, on a mobile computing device, an interactive voice response application which is configured to transmit a request from the mobile computing device to initiate communication with an interactive voice response system having a tree structure including files in a cloud computing system; determining a capacity of the mobile computing device to receive one or more files; conducting the interactive voice response dialogue using the cloud computing system until the mobile computing has the capacity to receive the one or more files; transmitting one or more files from the cloud computing system to the mobile computing device when the mobile computing device has the capacity to receive the one or more files; and conducting, on the mobile computing device, the interactive voice response dialogue based upon the received one or more files by using the interactive voice response application to perform the interactive voice response dialogue.

In another aspect, there is provided a method for providing an interactive voice response dialogue including receiving from a mobile computing device, which is executing an interactive voice response application, a request for communication with an interactive voice response system including files stored in a tree structure in a cloud computing system; transmitting a request from the cloud computing system to the mobile computing device for a capacity of the mobile computing device; receiving the capacity of the mobile computing device from the mobile computing device; transmitting one or more files from the cloud computing system to the mobile computing device based upon the capacity of the mobile computing device; and conducting, on the mobile computing device, the interactive voice response dialogue based upon the transmitted one or more files by using the interactive voice response application to perform the interactive voice response dialogue.

In another aspect, there is provided a cloud computing system for an interactive voice response dialogue including at least one memory comprising instructions and at least one hardware processor to execute the instructions within the at least one memory to implement receiving a request from a mobile computing device to initiate communication with an interactive voice response system having a tree structure including audio files in the cloud computing system; determining a capacity of the mobile computing device to receive one or more files; conducting the interactive voice response dialogue using the cloud computing system when the mobile computing device does not have the capacity to receive the one or more files; transmitting one or more files from the cloud computing system to the mobile computing device when the mobile computing device does have the capacity to receive the one or more files; and conducting the interactive voice response dialogue using the mobile computing device when the mobile computing device does have the capacity to receive the one or more files.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF THE EMBODIMENTS

Figure 1:
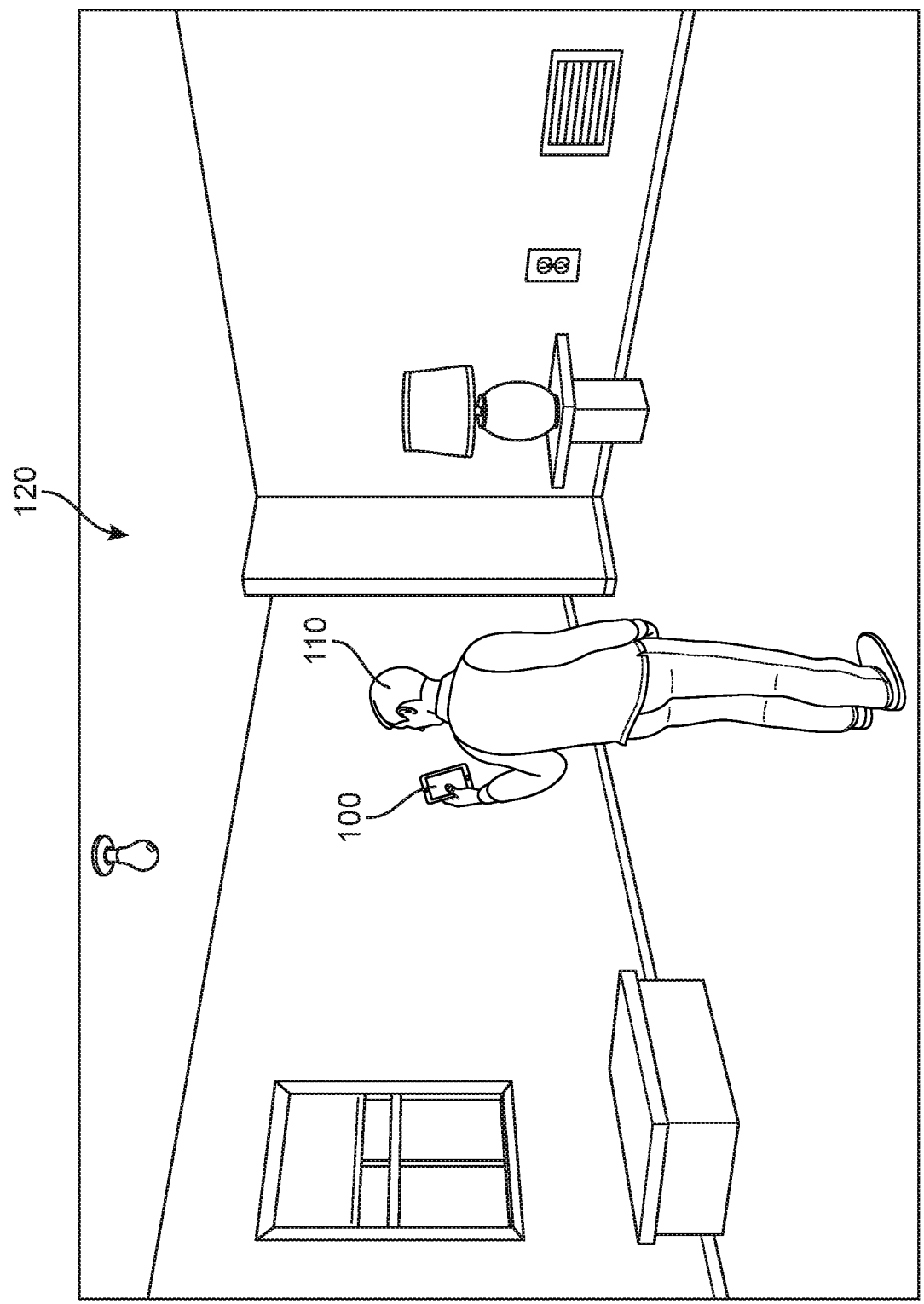
FIG. 1 is a view of a user holding a mobile computing device according to an embodiment.

Embodiments provide systems, devices, and methods for providing an interactive voice response dialogue between a user and an interactive voice response (IVR) system with a reduced latency by using a cloud computing system coupled to a mobile computing device. In order to reduce latency, a portion or all of the IVR system, which includes one or more files, can be pushed (transmitted) to (1) a node closer to a user of the mobile computing device or (2) the mobile computing device of the user who has activated an IVR application on the mobile computing device or made a telephone call to conduct the IVR dialogue. By pushing (transmitting) one or more files to the node or the mobile computing device, the mobile computing device may access and/or execute data files to decrease the latency caused by communication between the cloud computing system and the mobile computing device. The transmission of one or more files of the IVR system to the node or the mobile computing device may occur after the activation of the IVR application or the placing of the telephone call. The transmission of one or more files of the IVR system (handoff of the IVR system from the cloud computing system to the node or mobile computing device) can be performed at an intermediate time during the interactive voice response dialogue when the amount of data is sufficiently small enough to be handled by the node or the mobile computing device.

For example, when the mobile computing device has enough memory to accommodate the IVR system or a portion of the IVR system and has a quality of service indicative a connectivity of the mobile computing device to the cloud computing system, the mobile computing device may have the capacity to handle the IVR system or a portion of the IVR system. The capacity of the mobile computing device may be based upon the configuration of the mobile computing device including available memory and quality of service data indicative of a connectivity of the mobile computing device to the cloud computing system. The connectivity relates to data flow performance, which may be quantified or represented by quality of service data. The quality of service data may provide data indicative of one or more of available bandwidth, signal-to-noise ratio, packet loss, transmission delay, transmission delay variation, crosstalk, echo, bit rate, bit error rates, throughput, availability, interrupts, and jitter. This list is intended to provide examples and is not exhaustive. In addition, if the quality of service data is not stored in the mobile computing device, the quality of service data may be obtained from a network in an alternative embodiment.

An IVR system stored in a cloud computing system may store files in a tree structure. The IVR system may decide based on the capacity of the mobile computing device (e.g., available memory of mobile computing device and quality of service) what files can be transmitted from the IVR system in the cloud computing system to the mobile computing device. A K-Nearest-Neighbor (KNN) model may be utilized by the IVR system to assist in the determination as to what portion (what files) from the tree structure of the IVR system may be transmitted to the mobile computing device.

Accordingly, when the mobile computing device has the capacity to handle the IVR system or a portion of the IVR system, the handoff of the IVR system from the cloud computing system to the mobile computing device may occur. As indicated above, the transmission of one or more files of the IVR system (handoff of the IVR system from the cloud computing system to the mobile computing device) can be performed at an intermediate time during the interactive voice response dialogue when the amount of data is sufficiently small enough to be handled by the mobile computing device and there is a sufficient quality of service. By pushing the IVR system or a portion of the IVR system closer to the mobile computing device or to the mobile computing device, the latency of the IVR dialogue decreases because the IVR dialogue is conducted by much shorter route than by conducting the IVR dialogue with the cloud computing system.

FIG. 1 is a view of a user 110 holding a mobile computing device 100 in a room 120 of a home or office according to an embodiment. Although mobile computing device 100 is shown as a smartphone in FIG. 1, examples of mobile computing devices may include a smartphone, a tablet, a smartwatch, a smart glass, a smart helmet, and a laptop. Although embodiments refer to the use of mobile computing devices, any computing device could run software applications in embodiments of the present application.

Figure 2:
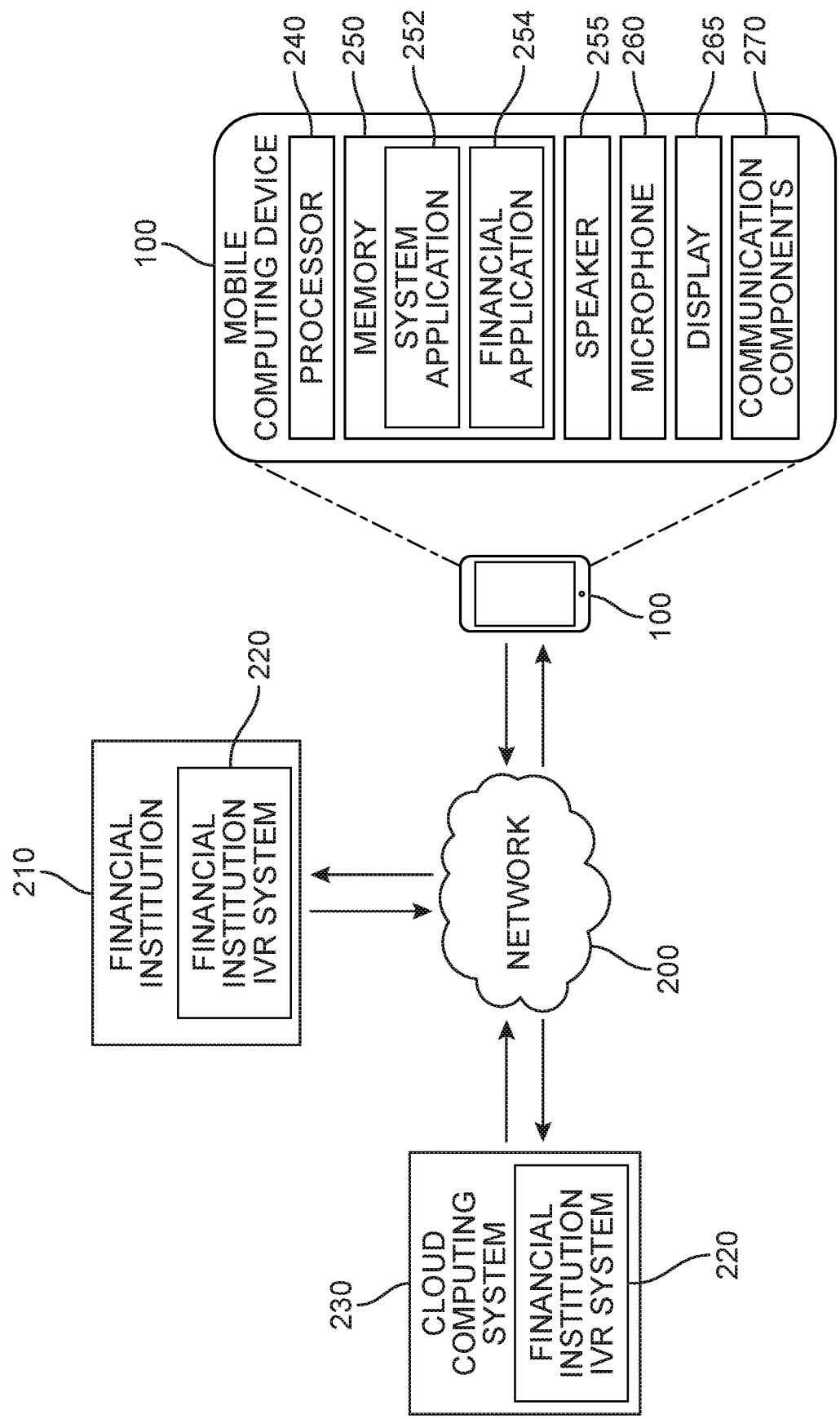
FIG. 2 is a schematic view of the mobile communication device of FIG. 1 coupled to a network according to an embodiment.

FIG. 2 is a schematic view of a mobile communication device 100 of FIG. 1 coupled to a network 200 according to an embodiment. A financial institution 210 may have a financial institution IVR system 220, which may be coupled to network 200. Alternatively, a financial institution IVR system 220 may be in a cloud computing system 230 which is coupled to network 200. The cloud computing system 230 may be managed by a financial institution or another organization specializing in providing cloud computer systems for customers such as financial institutions.

FIG. 2 shows the mobile communication device 100 of FIG. 1 in greater detail. The mobile computing device 100 includes a processor 240 and a memory 250. The memory 250 stores a system application 252 which includes an operating system. The memory 250 also stores a financial application 254. The user may activate the financial application 254 to access an IVR system. However, financial application 254 is only one example of an application which can be stored in the memory 250 and provide access to an IVR system. Other applications (not shown) may also be activated to provide access to other IVR systems. The memory 250 may also store other applications (not shown) such as a global positioning application which may provide the location of the mobile computing device. The mobile computing device 100 in FIG. 2 also includes a speaker 255 to receive audio communication from the IVR system and a microphone 260 so that a user can communicate with the IVR system. The mobile computing device includes a display 265, which can display a user interface and can be used to communicate with an IVR system. The mobile communication device 100 also includes communication components 270 to communicate with the IVR system.

Figure 3:
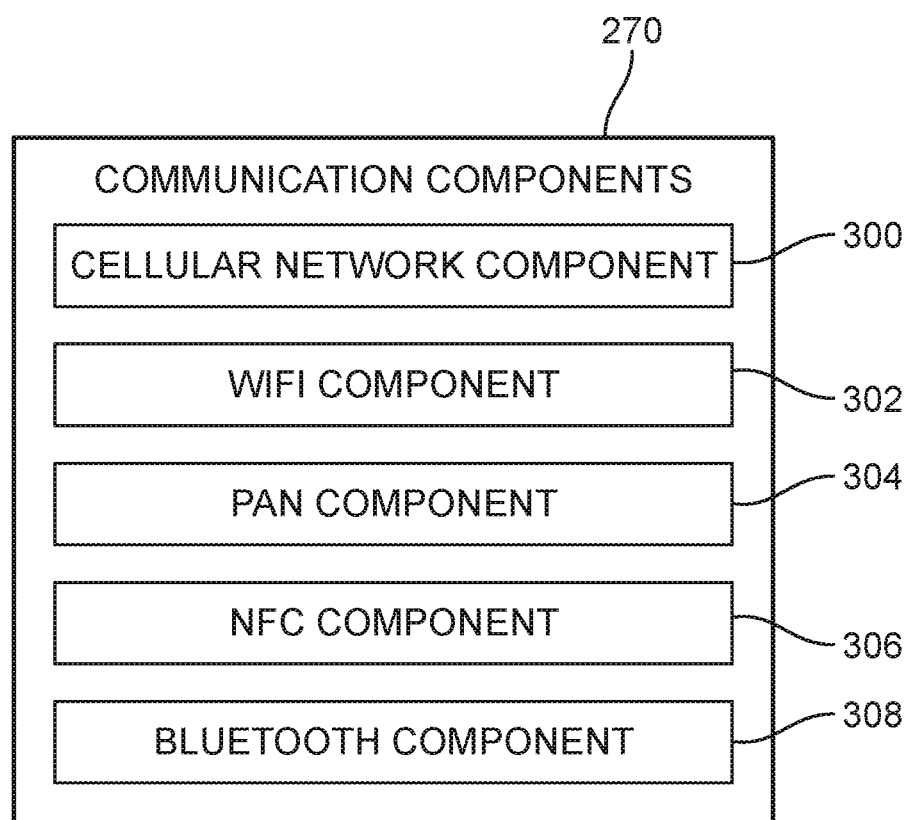
FIG. 3 is a schematic view of communication components of the mobile computing device shown in FIGS. 1 and 2 in an embodiment.

FIG. 3 is a schematic view of an example of communication components of the mobile computing device shown in FIGS. 1 and 2 in an embodiment. The communications components may include a cellular network component 300, a WIFI component 302, a personal area network (PAN) component 304, a near field communication (NFC) component 306, and a Bluetooth component 308. Any type of wireless or wired communication technology may be used to couple the mobile computing device 100 to the network 200 so that the mobile computing device can communicate with an IVR system. One or more of these communication components 270 may be used to couple the mobile computing device 100 to the network 200.

Figure 4:
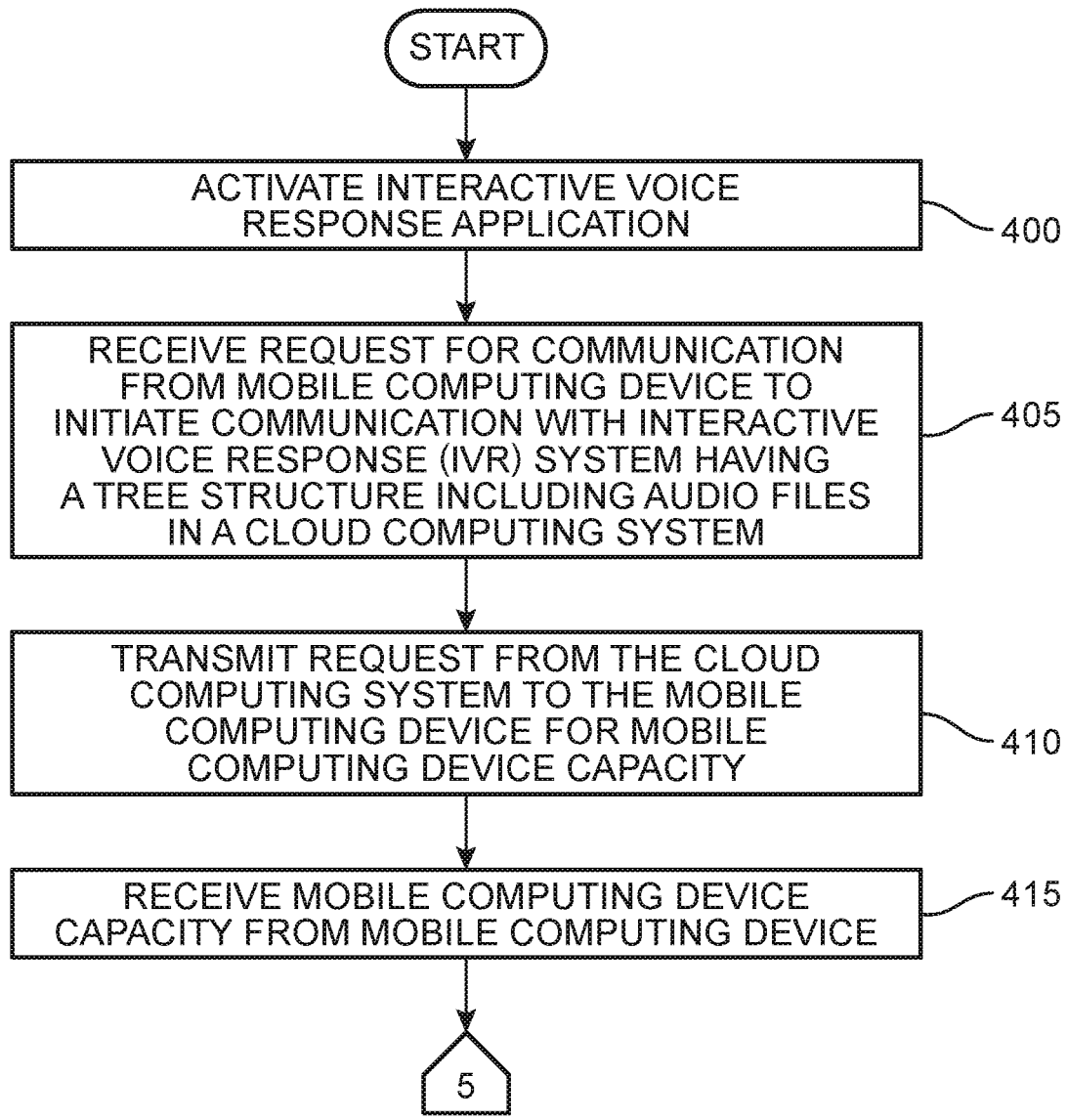
FIGS. 4 and 5 are schematic views of a process for providing an interactive voice response dialogue according to an embodiment.
Figure 5:
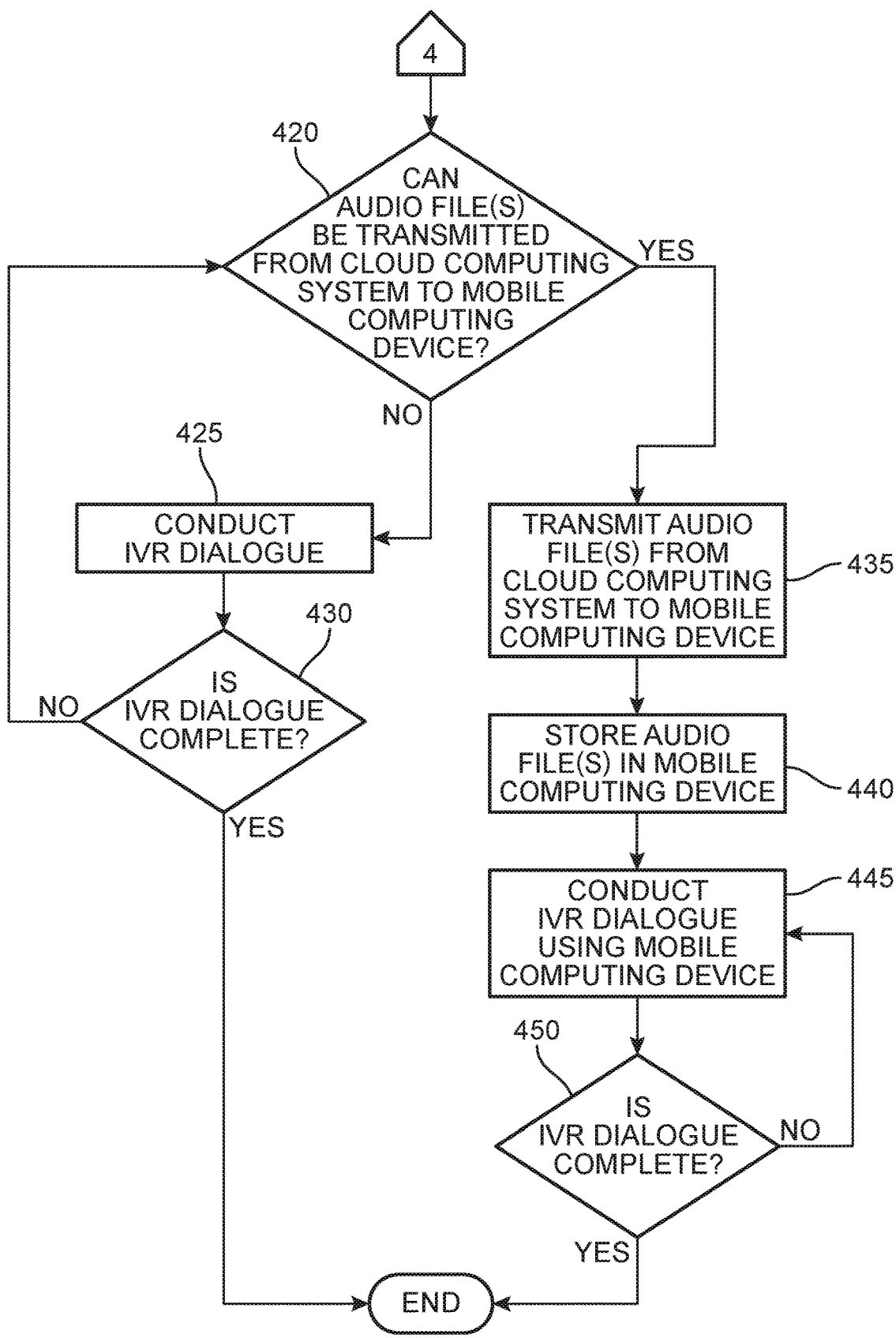
Figure 11:
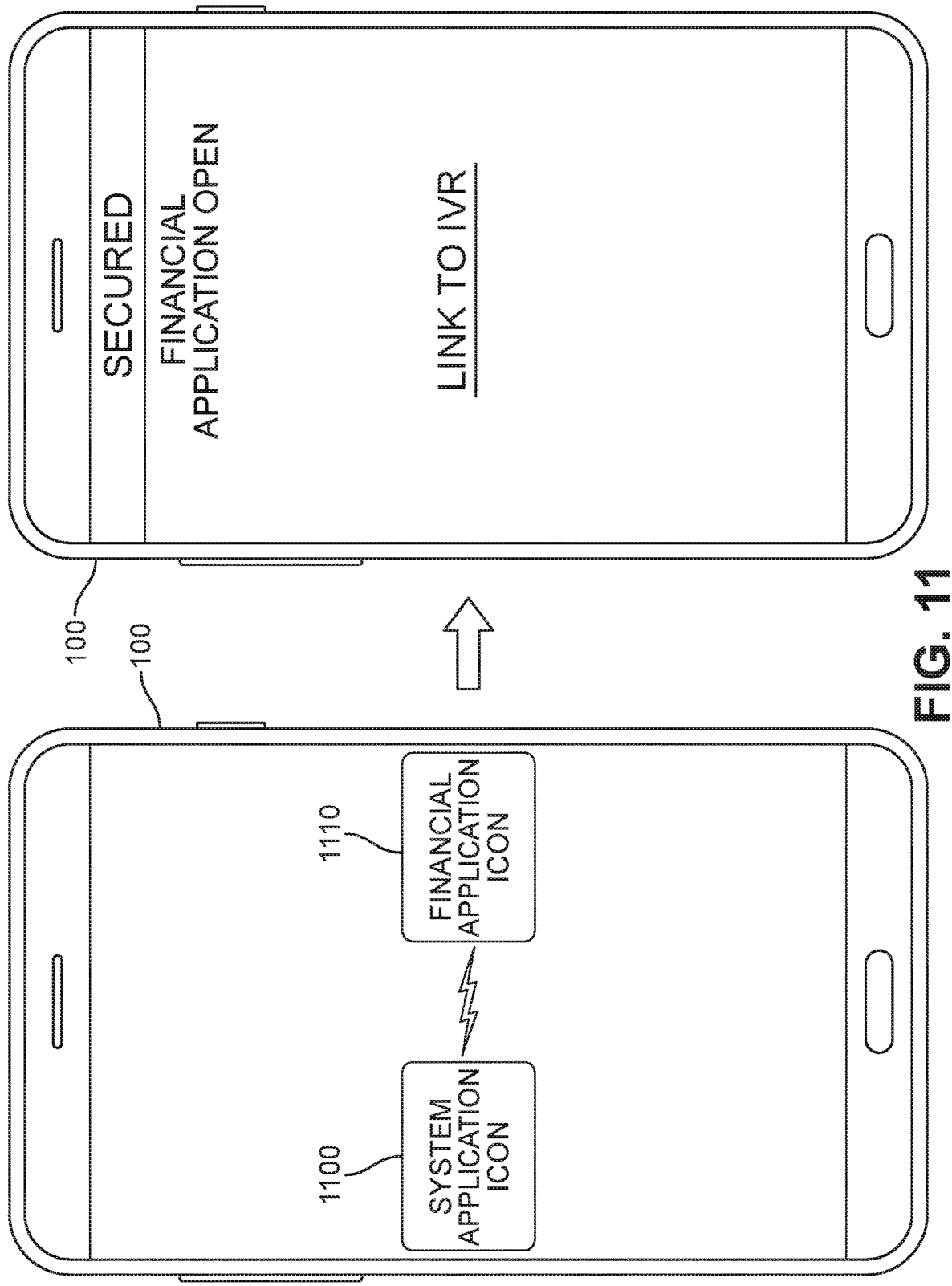
FIG. 11 is a schematic view of mobile computing device of FIG. 1 which shows an icon for an interactive voice response application for a financial institution, which upon activation, establishes communication between an IVR system and the mobile communication device of FIG. 1 according to an embodiment.

FIGS. 4 and 5 are schematic views of a process for providing an interactive voice response dialogue according to an embodiment. As indicated in FIG. 4, an interactive voice response (IVR) application may be activated on a mobile computing device 100 (operation 400). This IVR application may be activated in a number of ways such as by touch or by a voice command. An example of an IVR application may be a financial application. In FIG. 11, a financial application icon 1110 displayed on a display 265 of mobile computing device 100 may be touched by a user to activate the financial application, which may be an interactive voice response (IVR) application for a financial institution. Alternatively, this IVR application could be voice activated.

After the IVR application is activated (initiated), the mobile computing device 100 may transmit a request for communication to a financial institution IVR system 220 which may be hosted by a financial institution 210 or a cloud computing system 230. As discussed above, the cloud computing system 230 may be managed by a financial institution 210 or another organization specializing in providing cloud computer systems for customers such as financial institutions. In this example of this embodiment, a cloud computing system 230 hosts the IVR system 220, which has a tree structure including audio files. Accordingly, the IVR system 220 of the cloud computing system 230 receives a request for communication from the mobile computing device 100 to initiate communication with the IVR system 220 (operation 405). The cloud computing system may transmit a request to the mobile computing device 100 for a capacity of the mobile computing device 100 under the direction of the IVR system 220 (operation 410). The capacity of the mobile computing device 100 may be referred to as mobile computing device capacity. The cloud computing system 230 may receive the mobile computing device capacity of the mobile computing device 100 (operation 415). The capacity of the mobile computing device may be based upon the configuration of the mobile computing device 100 including available memory and quality of service data indicative of a connectivity of the mobile computing device 100 to the cloud computing system 230. The quality of service data indicative of connectivity may be stored on the mobile computing device 100. For example, the mobile computing device capacity may be the amount of memory available for storing audio files of the IVR system 220 stored in a tree structure in the memory of the cloud computing system 230 and the connectivity of the mobile computing device 100 to the cloud computing system 230, which may be determined based on quality of service data. As discussed above, the quality of service data may provide data indicative of one or more of available bandwidth, signal-to-noise ratio, packet loss, transmission delay, transmission delay variation, crosstalk, echo, bit rate, bit error rates, throughput, availability, interrupts, and jitter. This list is intended to provide examples and is not exhaustive. In addition, if the quality of service data is not stored in the mobile computing device 100, the quality of service data may be obtained from network 200 in an alternative embodiment.

Referring to FIG. 5, once the cloud computing system 230 receives the capacity of the mobile computing device 100, then the IVR system 220 and/or the cloud computing system 230 can determine whether the interactive voice response (IVR) dialogue can be performed on the mobile computing device 100. In the example in this embodiment, this determination is made at least in part based upon the amount of memory available for storing audio files and the quality of service (operation 420). For example, if one or more audio files cannot be transmitted from the cloud computing system 230 to the mobile computing device 100 because the mobile computing device 100 does not have sufficient memory capacity to store the one or more audio files and/or the quality of service is insufficient (operation 420), then the IVR dialogue may be conducted in the cloud computing system 230, which hosts the IVR system 220 (operation 425). If the IVR dialogue is complete (operation 430), then the IVR dialogue ends. However, if the IVR dialogue is only partially completed (operation 430), then the process returns to operation 420 to determine whether the mobile computing device 100 now has sufficient memory capacity and now provides a sufficient quality of service to receive the remaining audio files from the cloud computing system 230. For example, as discussed above, the audio files are stored in a tree structure in the IVR system 220 of the cloud computing system 230. As questions by the IVR system are answered by the user during an IVR dialogue, the number of audio files required to continue the IVR dialogue decreases. Accordingly, during the IVR dialogue conducted using the cloud computing system 230, the number of one or more audio files that would be required to be transmitted to the mobile computing device 100 would be reduced. When the mobile computing device 100 has the capacity to receive the remaining one or more audio files to complete the IVR dialogue and the quality of service is sufficient, then these one or more remaining audio files may be transmitted from the IVR system 220 by the cloud computing system 230 to the mobile computing device 100 (operations 420 and 435). These one or more audio files are stored in the memory of the mobile computing device 100 (operation 440). These one or more audio files may be stored in a tree structure in the memory of the mobile computing device 100. The IVR dialogue continues to be conducted using the audio files stored in the mobile computing device 100 in order to reduce the route (path) to decrease the latency caused by transmitting and receiving audio files between the cloud computing system 230 and mobile device 100. Instead, the IVR dialogue is conducted only by the mobile computing device 100 and the user until the IVR dialogue is completed (operations 445 and 450). When the IVR dialogue is completed (operation 450), then the IVR dialogue ends.

Figure 6:
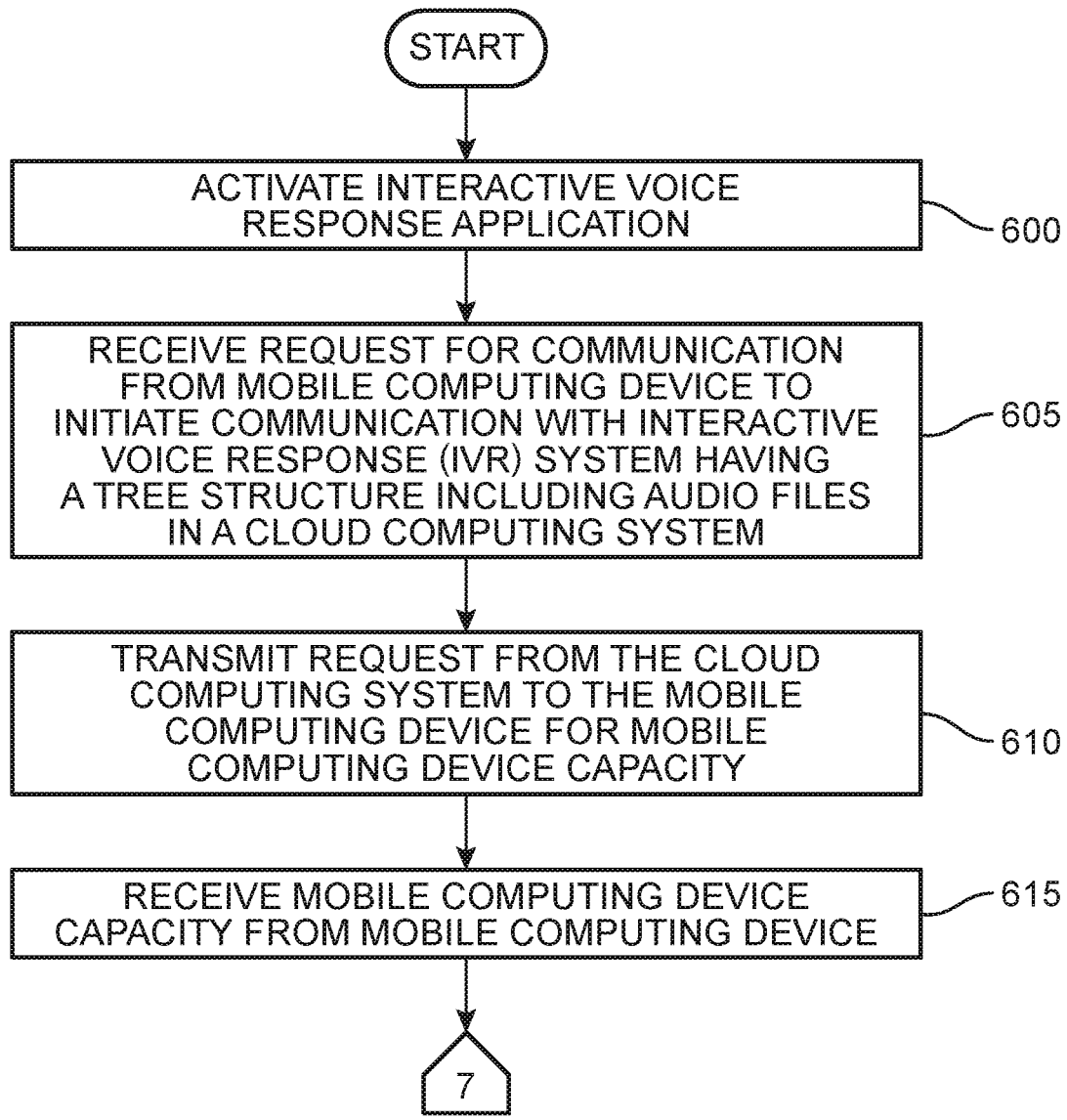
FIGS. 6 and 7 are schematic views of a process for providing an interactive voice response dialogue according to an embodiment.
Figure 7:
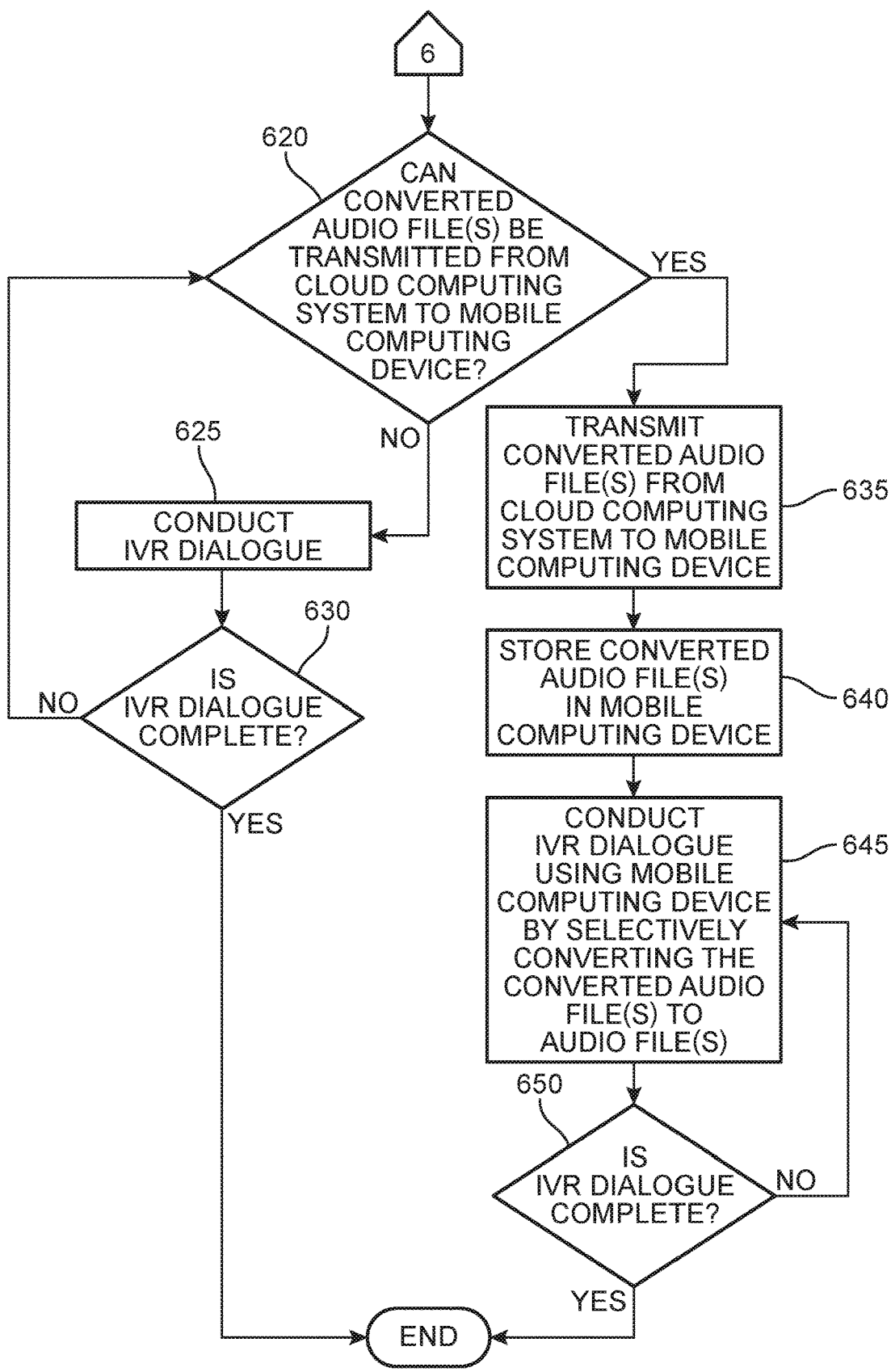

FIGS. 6 and 7 are schematic views of a process for providing an interactive voice response dialogue according to an embodiment. As indicated in FIG. 6, an interactive voice response (IVR) application may be activated on a mobile computing device 100 (operation 600). This IVR application may be activated in a number of ways such as by touch or by a voice command. An example of an IVR application may be a financial application. In FIG. 11, a financial application icon 1110 displayed on a display 265 of mobile computing device 100 may be touched by a user to activate the financial application, which may be an interactive voice response (IVR) application for a financial institution. Alternatively, this IVR application could be voice activated.

After the IVR application is activated (initiated), the mobile computing device 100 may transmit a request for communication to a financial institution IVR system 220 which may be hosted by a financial institution 210 or a cloud computing system 230. As discussed above, the cloud computing system 230 may be managed by a financial institution 210 or another organization specializing in providing cloud computer systems for customers such as financial institutions. In this example of this embodiment, a cloud computing system 230 hosts the IVR system 220, which has a tree structure including audio files. Accordingly, the IVR system 220 of the cloud computing system 230 receives a request for communication from the mobile computing device 100 to initiate communication with the IVR system 220 (operation 605). The cloud computing system may transmit a request to the mobile computing device 100 for a capacity of the mobile computing device 100 under the direction of the IVR system 220 (operation 610). The capacity of the mobile computing device 100 may be referred to as mobile computing device capacity. The cloud computing system 230 may receive the mobile computing device capacity of the mobile computing device 100 (operation 615). The capacity of the mobile computing device 100 may be based upon the configuration of the mobile computing device 100 including available memory and quality of service data indicative of connectivity of the mobile computing device 100 to the cloud computing system 230. The quality of service data indicative of connectivity may be stored on the mobile computing device 100. For example, the mobile computing device capacity may be the amount of memory available for storing audio files of the IVR system 220 stored in a tree structure in the memory of the cloud computing system 230 and the connectivity of the mobile computing device 100 to the cloud computing system 230, which may be determined based on quality of service data. As discussed above, the quality of service data may provide data indicative of one or more of available bandwidth, signal-to-noise ratio, packet loss, transmission delay, transmission delay variation, crosstalk, echo, bit rate, bit error rates, throughput, availability, interrupts, and jitter. This list is intended to provide examples and is not exhaustive. In addition, if the quality of service data is not stored in the mobile computing device 100, the quality of service data may be obtained from network 200 in an alternative embodiment.

Referring to FIG. 7, once the cloud computing system 230 receives the capacity of the mobile computing device 100, then the IVR system 220 and/or the cloud computing system 230 can determine whether the interactive voice response (IVR) dialogue can be performed on the mobile computing device 100. In the example in this embodiment, this determination is made at least in part based upon the amount of memory available for storing converted audio files and the quality of service (operation 620). For example, if the audio files of the IVR system 220, which are stored in a tree structure in the memory of the cloud computing system 230, are converted into text files or other types of files requiring less memory, a determination can be made as to whether the converted audio files can be stored in the memory of the mobile computing device 100.

For example, if one or more converted audio files cannot be transmitted from the cloud computing system 230 to the mobile computing device 100 because the mobile computing device 100 does not have sufficient memory capacity to store the one or more converted audio files and/or the quality of service is insufficient (operation 620), then the IVR dialogue is conducted in the cloud computing system 230, which hosts the IVR system 220, using the audio files (operation 625). If the IVR dialogue is complete (operation 630), then the IVR dialogue ends. However, if the IVR dialogue is only partially completed (operation 630), then the process returns to operation 620 to determine whether the mobile computing device 100 now has sufficient memory capacity to receive the remaining audio files from the cloud computing system 230 if the remaining audio files were converted to text files or other types of files, which decrease the amount of data to be stored in memory, and the quality of service is sufficient.

More specifically, as discussed above, the audio files are stored in a tree structure in the IVR system 220 of the cloud computing system 230. As questions by the IVR system are answered by the user during an IVR dialogue, the number of audio files required to continue the IVR dialogue decreases. Accordingly, during the IVR dialogue conducted using the cloud computing system 230, the number of one or more converted audio files that would be required to be transmitted to the mobile computing device 100 would also be reduced. When the mobile computing device 100 has the capacity to receive the remaining one or more converted audio files to complete the IVR dialogue and the quality of service is sufficient, then these one or more remaining converted audio files may be transmitted from the IVR system 220 by the cloud computing system 230 to the mobile computing device 100 (operations 620 and 635). These one or more converted audio files are stored in the memory of the mobile computing device 100 (operation 640). These one or more converted audio files may be stored in a tree structure in the memory of the mobile computing device 100. The IVR dialogue continues to be conducted using the mobile computing device 100 by selectively converting the converted audio files to audio files (operation 645). By selectively converting the converted audio files stored in the mobile computing device 100 into audio files, this process reduces the route (path) to decrease the latency caused by transmitting and receiving audio files between the cloud computing system 230 and mobile device 100. Instead, the IVR dialogue is conducted only by the mobile computing device 100 and the user until the IVR dialogue is completed (operations 645 and 650). When the IVR dialogue is completed (operation 650), then the IVR dialogue ends.

Figure 8:
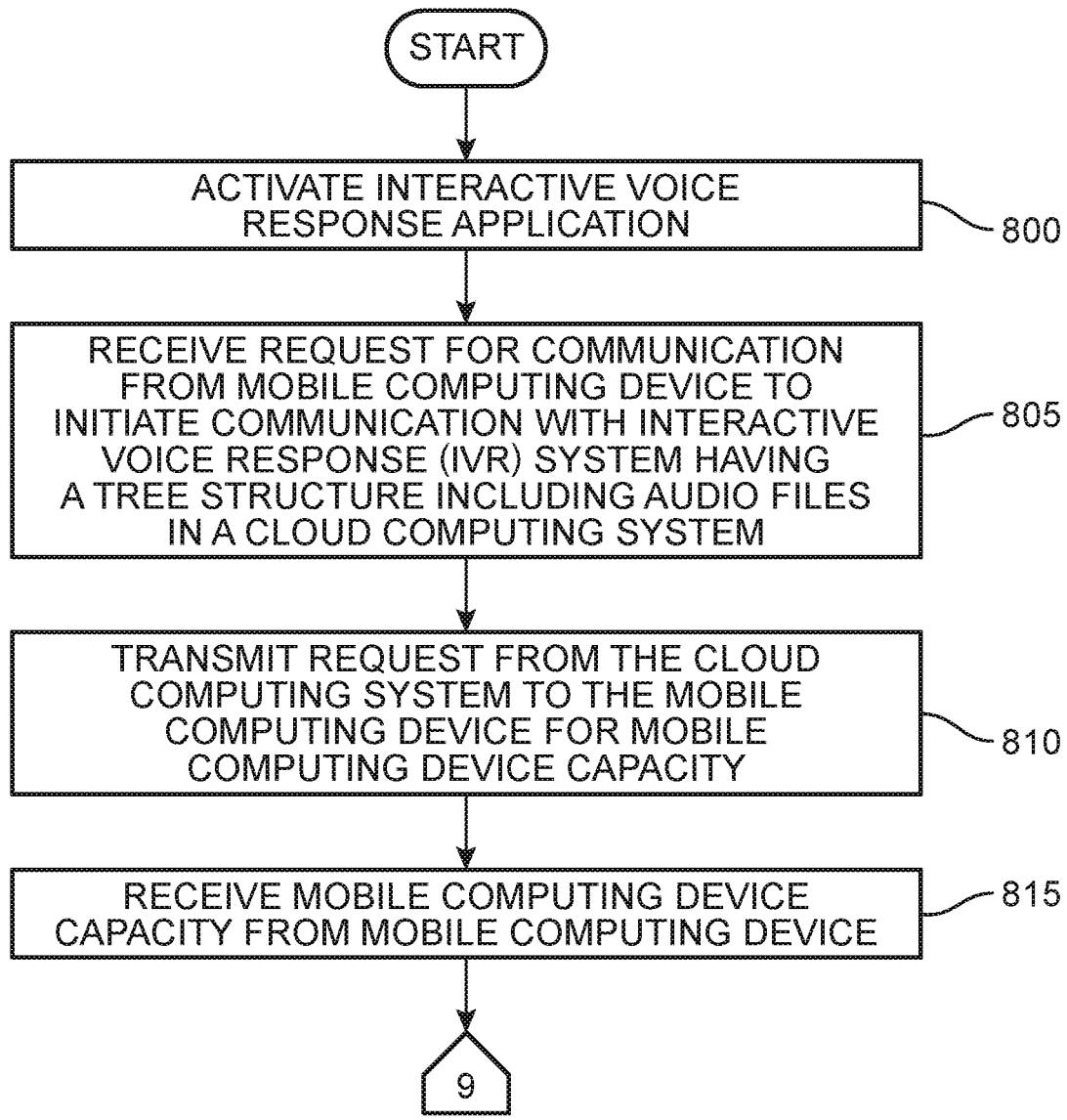
FIGS. 8 and 9 are schematic views of a process for providing an interactive voice response dialogue according to an embodiment.
Figure 9:
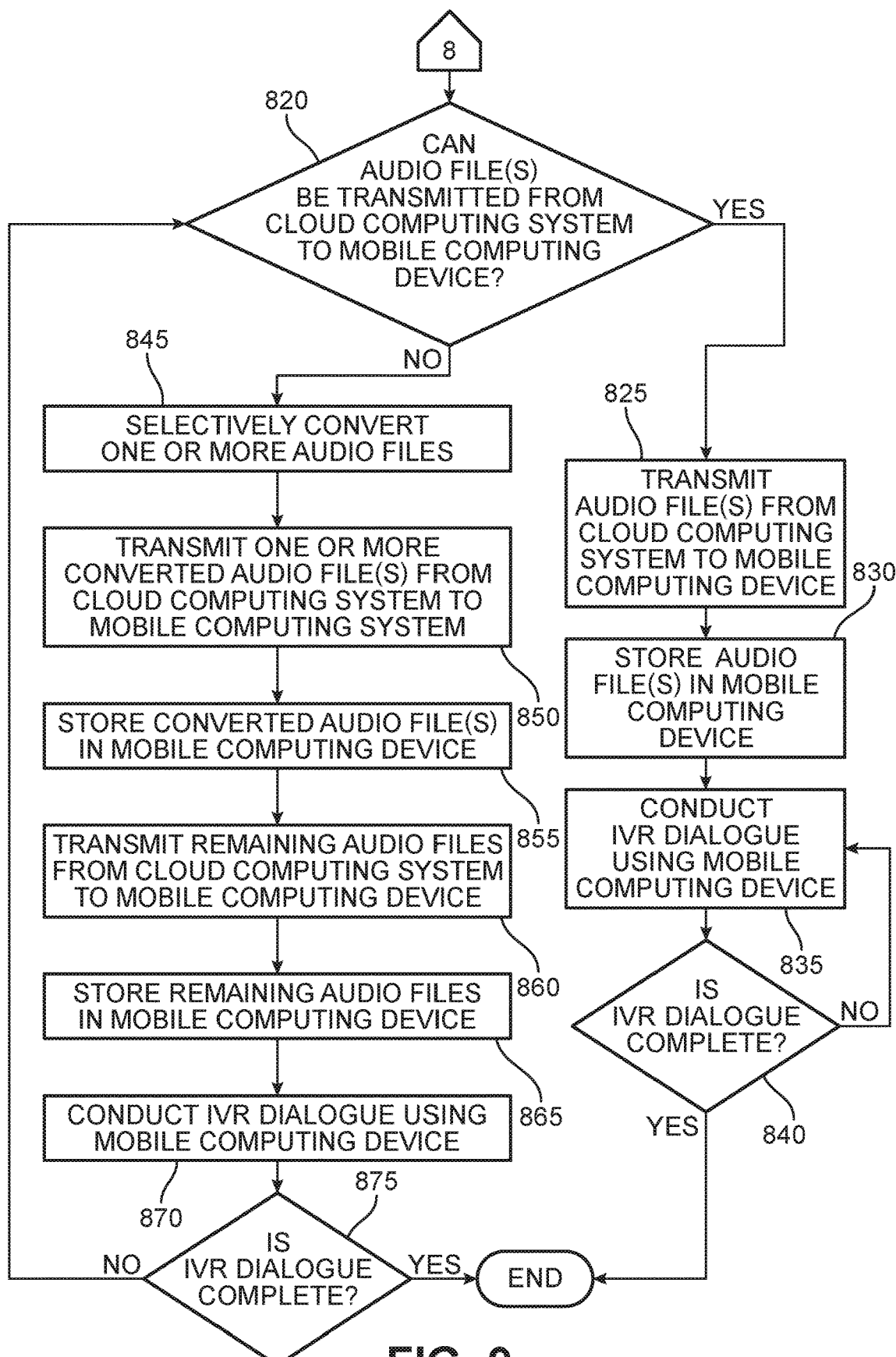

FIGS. 8 and 9 are schematic views of a process for providing an interactive voice response dialogue according to an embodiment. As indicated in FIG. 8, an interactive voice response (IVR) application may be activated on a mobile computing device 100 (operation 800). This IVR application may be activated in a number of ways such as by touch or by a voice command. An example of an IVR application may be a financial application. In FIG. 11, a financial application icon 1110 displayed on a display 265 of mobile computing device 100 may be touched by a user to activate the financial application, which may be an interactive voice response (IVR) application for a financial institution. Alternatively, this IVR application could be voice activated.

After the IVR application is activated (initiated), the mobile computing device 100 may transmit a request for communication to a financial institution IVR system 220 which may be hosted by a financial institution 210 or a cloud computing system 230. As discussed above, the cloud computing system 230 may be managed by a financial institution 210 or another organization specializing in providing cloud computer systems for customers such as financial institutions. In this example of this embodiment, a cloud computing system 230 hosts the IVR system 220, which has a tree structure including audio files. Accordingly, the IVR system 220 of the cloud computing system 230 receives a request for communication from the mobile computing device 100 to initiate communication with the IVR system 220 (operation 805). The cloud computing system may transmit a request to the mobile computing device 100 for a capacity of the mobile computing device 100 under the direction of the IVR system 220 (operation 810). The capacity of the mobile computing device 100 may be referred to as mobile computing device capacity. The cloud computing system 230 may receive the mobile computing device capacity of the mobile computing device 100 (operation 815). The capacity of the mobile computing device 100 may be based upon the configuration of the mobile computing device 100 including available memory and quality of service data indicative of a connectivity of the mobile computing device 100 to the cloud computing system 230. The quality of service data indicative of connectivity may be stored in the mobile computing device 100. The mobile computing device capacity may be the amount of memory available for storing audio files of the IVR system 220 stored in a tree structure in the memory of the cloud computing system 230 and the connectivity of the mobile computing device 100 to the cloud computing system 230, which may be determined based on quality of service data. As discussed above, the quality of service data may provide data indicative of one or more of available bandwidth, signal-to-noise ratio, packet loss, transmission delay, transmission delay variation, crosstalk, echo, bit rate, bit error rates, throughput, availability, interrupts, and jitter. This list is intended to provide examples and is not exhaustive. In addition, if the quality of service data is not stored in the mobile computing device 100, the quality of service data may be obtained from network 200 in an alternative embodiment.

Referring to FIG. 9, once the cloud computing system 230 receives the capacity of the mobile computing device 100, then the IVR system 220 and/or the cloud computing system 230 can determine whether the interactive voice response (IVR) dialogue can be performed on the mobile computing device 100. In the example in this embodiment, this determination is made at least in part based upon the amount of memory available for storing audio files and the quality of service (operation 820). For example, if one or more audio files can be transmitted from the cloud computing system 230 to the mobile computing device 100 because the mobile computing device 100 has sufficient memory capacity to store the one or more audio files and the quality of service is sufficient (operation 820), then the IVR dialogue can be conducted using the mobile computing device 100. More specifically, if it is determined that the one or more audio files can be transmitted from the cloud computing system 230 to the mobile computing device 100 (operation 820), the one or more audio files are transmitted form the cloud computing system 230 to the mobile computing device (operation 825) and the one or more audio files are stored in the mobile computing device 100 (operation 830). These one or more audio files may be stored in a tree structure in the memory of the mobile computing device 100. An IVR dialogue is conducted using the mobile computing device 100 until the IVR dialogue is completed (operations 835 and 840). As discussed above, the IVR dialogue continues to be conducted using the audio files stored in the mobile computing device 100 in order to reduce the route (path) to decrease the latency caused by transmitting and receiving audio files between the cloud computing system 230 and mobile device 100. Instead, the IVR dialogue is conducted only by the mobile computing device 100 and the user until the IVR dialogue is completed (operations 835 and 840). When the IVR dialogue is completed (operation 840), then the IVR dialogue ends.

Referring to operation 820 in FIG. 9, if one or more audio files cannot be transmitted from the cloud computing system 230 to the mobile computing device 100 because the mobile computing device 100 does not have sufficient memory capacity to store the one or more audio files and/or the quality of service is insufficient (operation 820), then one or more audio files are selectively converted (operation 845). The one or more converted audio files are transmitted from the cloud computing system 230 to the mobile computing device 100 (operation 850) and the one or more converted audio files are stored in the mobile computing device (operation 855). The one or more audio files, which have not been converted (remaining audio files), may be transmitted from the cloud computing system 230 to the mobile computing device 100 (operation 860) and these one or more audio files (remaining audio files) may be stored in mobile computing device 100 (operation 865). These one or more audio files and converted audio files may be stored in a tree structure in the memory of the mobile computing device 100.

Because the audio files and the converted audio files of the IVR system have now been transmitted from the cloud computing system 230 to the mobile computing device 100, an IVR dialogue can be conducted using the mobile computing device 100 (operation 870). Any converted audio files stored in the mobile computing device 100 may be converted to audio files as needed in order to conduct the IVR dialogue (operation 870). As discussed above, the IVR dialogue continues to be conducted using the one or more audio files and one or more converted audio files stored in the mobile computing device 100 in order to reduce the route (path) to decrease the latency caused by transmitting and receiving audio files between the cloud computing system 230 and mobile device 100. Instead, the IVR dialogue is conducted only by the mobile computing device 100 and the user until the IVR dialogue is completed (operations 870 and 875). When the IVR dialogue is completed (operation 840), then the IVR dialogue ends.

Figure 10:
FIG. 10 is a schematic view of a mobile computing device of FIG. 1 which shows a keypad for initiating a telephone call to communicate with the interactive voice response system according to an embodiment.

FIG. 10 is a schematic view of a mobile computing device 100 of FIG. 1 which shows a keypad on a display 265 of the mobile computing device 100. By a user entering a phone number, the mobile computing device 100 can access an IVR system. In another example, FIG. 11 is a schematic view of mobile communication device 100 of FIG. 1 which shows an icon 1100 of a system application and an icon 1110 for an interactive voice response (IVR) application for a financial institution, which upon activation, establishes communication between an IVR system and the mobile communication device of FIG. 1 according to an embodiment. Although an IVR application for a financial institution is discussed in the present disclosure, this IVR application may be applied to any IVR system. FIG. 11 shows activation the IVR application, which can occur by touching the financial application icon 1110 on display 265 or by speaking into microphone 260 to provide a communication link to the IVR system.

It may be appreciated that the above systems and methods may apply not only to financial applications but also to any applications requesting an IVR dialogue, and any computing device and any network may be used to implement the above systems and methods. It is also understood that various icons can be displayed on the display of the mobile computing device or other computing devices implementing the methods and systems in embodiments.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method for providing an interactive voice response dialogue between a mobile computing device and an interactive voice response system comprising:

activating, on the mobile computing device, an interactive voice response application which is configured to transmit a request from the mobile computing device to initiate communication with the interactive voice response system having a tree structure including files in a cloud computing system;

determining a capacity of the mobile computing device to receive one or more files from the tree structure in the cloud computing system;

conducting the interactive voice response dialogue between the mobile computing device and the interactive voice response system using the tree structure in the cloud computing system until the mobile computing has the capacity to receive the one or more files;

during the interactive voice response dialogue between the mobile computing device and the interactive voice response system, transmitting one or more files from the cloud computing system to the mobile computing device when the mobile computing device has the capacity to receive the one or more files, wherein the transmitted one or more files are stored in a tree structure in a memory of the mobile computing device; and conducting, on the mobile computing device, the interactive voice response dialogue between the mobile computing device and the interactive voice response system using the interactive voice response application on the mobile computing device to perform the interactive voice response dialogue using the transmitted one or more files from the cloud computing system that are stored in the tree structure on the mobile computing device.

2. The method of claim 1, wherein the one or more files include audio data files.

3. The method of claim 1, wherein the one or more files include text data files.

4. The method of claim 1, wherein the one or more files include audio data files and text data files.

5. The method of claim 1, wherein the capacity of the mobile computing device is based upon available memory of the mobile computing device and quality of service data indicative of a connectivity of the mobile computing device to the cloud computing system.

6. The method of claim 1, wherein the determining of the capacity of the mobile computing device comprises:
transmitting a request from the cloud computing system to the mobile computing device for the capacity of the mobile computing device; and
transmitting the capacity of the mobile computing device from the mobile computing device to the cloud computing system.

7. The method of claim 1, wherein the one or more files are audio data files and wherein the method further comprises:
determining that the mobile computing device has the capacity to receive the one or more files after a first portion of the interactive voice response dialogue using the cloud computing system is conducted; and
converting a second portion of the one or more files from audio data files to text data files before transmitting the text data files as the one or more files from the cloud computing system to the mobile computing device.

8. The method of claim 1, wherein the conducting the interactive voice response dialogue using the mobile computing device including the transmitted one or more files includes converting the text data files to audio files by the mobile computing device by using the interactive voice response application.

9. A method for providing an interactive voice response dialogue between a mobile computing device and an interactive voice response system comprising:
receiving from the mobile computing device, which is executing an interactive voice response application, a request for communication with the interactive voice response system including files stored in a tree structure in a cloud computing system;
transmitting a request from the cloud computing system to the mobile computing device for a capacity of the mobile computing device to receive one or more files from the tree structure in the cloud computing system;
receiving the capacity of the mobile computing device from the mobile computing device;
during the interactive voice response dialogue between the mobile computing device and the interactive voice response system, transmitting one or more files from the cloud computing system to the mobile computing device based upon the capacity of the mobile computing device, wherein the transmitted one or more files are stored in a tree structure in a memory of the mobile computing device; and conducting, on the mobile computing device, the interactive voice response dialogue between the mobile computing device and the interactive voice response system using the interactive voice response application on the mobile computing device to perform the interactive voice response dialogue using the transmitted one or more files from the cloud computing system that are stored in the tree structure on the mobile computing device.

10. The method of claim 9, wherein the one or more files include audio data files.

11. The method of claim 9, wherein the one or more files include text data files.

12. The method of claim 9, wherein the one or more files include audio data files and text data files.

13. The method of claim 9, wherein:
the one or more files stored in the cloud computing system include one or more audio files; and
the transmitted one or more files were converted from audio files to text data files before the transmitted one or more files were transmitted from the cloud computing system to the mobile computing device.

14. The method of claim 9, wherein the transmitted one or more files include text data files and the interactive voice response application of the mobile computing device converts the text data files to audio files.

15. The method of claim 9, further comprising activating, on the mobile computing device, the interactive voice response application to transmit the request for communication with the interactive voice response system.

16. The method of claim 9, wherein the mobile computing device includes one of a smartphone, a tablet, a smartwatch, a smart glass, a smart helmet, and a laptop.

17. A cloud computing system for an interactive voice response dialogue between a mobile computing device and an interactive voice response system comprising at least one memory comprising instructions and at least one hardware processor to execute the instructions within the at least one memory to implement:
receiving a request from the mobile computing device to initiate communication with the interactive voice response system having a tree structure including audio files stored in the cloud computing system;
determining a capacity of the mobile computing device to receive one or more files from the tree structure in the cloud computing system;
conducting the interactive voice response dialogue between the mobile computing device and the interactive voice response system using the tree structure in the cloud computing system when the mobile computing device does not have the capacity to receive the one or more files;
during the interactive voice response dialogue between the mobile computing device and the interactive voice response system, transmitting one or more files from the cloud computing system to the mobile computing device when the mobile computing device does have the capacity to receive the one or more files, wherein the transmitted one or more files are stored in a tree structure in a memory of the mobile computing device; and
after transmitting the one or more files to the mobile computing device, continue conducting the interactive voice response dialogue between the mobile computing device and the interactive voice response system using the transmitted one or more files from the cloud computing system that are stored in the tree structure on the mobile computing device.

18. The cloud computing system of claim 17, wherein the one or more files include audio data files.

19. The cloud computing system of claim 17, wherein the one or more files include text data files.

20. The cloud computing system of claim 17, wherein the one or more files include audio data files and text data files.

\* \* \* \* \*